United States Patent
Hietaniemi et al.

(10) Patent No.: US 10,767,315 B2
(45) Date of Patent: Sep. 8, 2020

(54) SYSTEM AND METHOD FOR MANUFACTURE OF PAPER, BOARD OR THE LIKE

(71) Applicant: Kemira Oyj, Helsinki (FI)

(72) Inventors: Matti Hietaniemi, Espoo (FI); Asko Karppi, Turku (FI)

(73) Assignee: Kemira Oyj, Helsinki (FI)

( * ) Notice: Subject to any disclaimer, the term of this patent is extended or adjusted under 35 U.S.C. 154(b) by 151 days.

(21) Appl. No.: 16/078,034

(22) PCT Filed: Mar. 22, 2017

(86) PCT No.: PCT/FI2017/050196
§ 371 (c)(1),
(2) Date: Aug. 21, 2018

(87) PCT Pub. No.: WO2017/162920
PCT Pub. Date: Sep. 28, 2017

(65) Prior Publication Data
US 2019/0048529 A1    Feb. 14, 2019

(30) Foreign Application Priority Data

Mar. 22, 2016  (FI) ..................... 20165234

(51) Int. Cl.
| | | |
|---|---|---|
| D21H 21/10 | (2006.01) | |
| D21H 17/66 | (2006.01) | |
| D21H 17/68 | (2006.01) | |
| D21H 17/37 | (2006.01) | |
| D21H 17/29 | (2006.01) | |
| D21H 17/44 | (2006.01) | |
| D21H 21/18 | (2006.01) | |

(52) U.S. Cl.
CPC ............. *D21H 21/10* (2013.01); *D21H 17/29* (2013.01); *D21H 17/375* (2013.01); *D21H 17/44* (2013.01); *D21H 17/66* (2013.01); *D21H 17/68* (2013.01); *D21H 21/18* (2013.01)

(58) Field of Classification Search
USPC ........................................ 162/164
See application file for complete search history.

(56) References Cited

U.S. PATENT DOCUMENTS

| | | |
|---|---|---|
| 6,313,246 B1 | 11/2001 | Carter et al. |
| 2002/0195218 A1 | 12/2002 | Chen |
| 2008/0004405 A1 | 1/2008 | Mori et al. |
| 2010/0084103 A1 | 4/2010 | Reinicke |
| 2010/0300633 A1 | 12/2010 | Goto et al. |
| 2012/0325420 A1 | 12/2012 | Esser et al. |

FOREIGN PATENT DOCUMENTS

| | | |
|---|---|---|
| EP | 1834040 A1 | 9/2007 |
| JP | 2004300635 A | 10/2004 |
| JP | 4517662 B2 | 8/2010 |
| WO | 2014199996 A1 | 12/2014 |

OTHER PUBLICATIONS

Finnish Patent and Registration Office, Search report issued for appln. No. 20165234 dated Oct. 14, 2016.

*Primary Examiner* — Mark Halpern
(74) *Attorney, Agent, or Firm* — Berggren LLP

(57) ABSTRACT

Drainage and press dewatering system for manufacture of paper, board or the like, comprising (a) amphoteric polyacrylamide, which is a copolymer obtained by polymerizing (meth)acrylamide and 1-80 mol-% of cationic monomers and/or 0.1-70 mol-% of anionic monomers, the polyacrylamide having an intrinsic viscosity in the range of 6-38 dl/g, (b) inorganic microparticles of siliceous material, such as colloidal silica or bentonite, and (c) a high-charged cationic coagulant having a charge density over 5 meq/g and preferably over 6 meq/g determined at pH 6 and selected from aluminium based coagulants, organic polymers and mixtures thereof.

24 Claims, No Drawings

SYSTEM AND METHOD FOR MANUFACTURE OF PAPER, BOARD OR THE LIKE

PRIORITY

This application is a U.S national application of the international application number PCT/FI2017/050196 filed on Mar. 22, 2017 and claiming priority of Finnish national application No. 20165234 filed on Mar. 22, 2016 the contents of all of which are incorporated herein by reference.

The present invention relates to a system and method for manufacture of paper, board or the like according to the independent claims presented below.

Paper and board is made by dewatering a pulp suspension, forming a uniform web, and drying the web. During the papermaking process, various chemicals are commonly added to increase the productivity and also enhance paper physical properties. For example, retention/drainage aids are added to the pulp suspension to increase dewatering rate of the pulp. Typically, one of the limiting steps in achieving faster production speeds in paper or board manufacturing is the dewatering.

Paper strength resins are also often introduced to increase dry strength and/or wet strength of the produced paper or board. Amphoteric polyacrylamide, which is a copolymer of acrylamide and monomers comprising anionic and cationic groups, has been used as dry strength agent in papermaking industry. However, amphoteric polyacrylamides are not effective in improving the drainage due to anionic charges in the polymer.

It would be beneficial to develop a chemical program comprising commonly used amphoteric polyacrylamide to increase both drainage rate and also paper strength properties.

An object of this invention is to minimise or possibly even eliminate the disadvantages existing in the prior art.

Another object of the present invention is to provide simple and effective method for manufacturing paper, board or the like with improved drainage and press dewatering and increased dry strength properties, such as burst strength and/or short span compression test (SCT) strength.

In order to achieve among others the objects presented above, the invention is characterized by what is presented in the characterizing parts of the enclosed independent claims.

Some preferable embodiments of the invention will be described in the dependent claims.

The embodiments and advantages mentioned in this text relate, where applicable, both to the system, the method as well as to the uses according to the invention, even though it is not always specifically mentioned.

A typical drainage and press dewatering system according to the present invention for manufacture of paper, board or the like comprises (a) amphoteric polyacrylamide, which is a copolymer obtained by polymerizing (meth)acrylamide and 1-80 mol-% of cationic monomers and 0.1-70 mol-% of anionic monomers, the polyacrylamide having an intrinsic viscosity in the range of 6-38 dl/g determined in 1 M NaCl at 25° C., (b) inorganic microparticles of siliceous material, such as colloidal silica or bentonite, and (c) a high-charged cationic coagulant having a charge density over 5 meq/g and preferably over 6 meq/g determined by Mütek PCD at pH 6, and selected from aluminium based coagulants, organic polymers and mixtures thereof.

A typical method according to the invention for manufacture of paper, board or the like comprises obtaining a fibre stock comprising fibres originating from recycled fibre material, unbleached kraft pulping and/or unbleached semichemical pulping, whereby the fibre stock has a conductivity of at least 1 mS/cm, adding to the fibre stock an aqueous solution of a water-soluble amphoteric polyacrylamide, which is a copolymer obtained by polymerizing (meth)acrylamide and 1-80 mol-% of cationic monomers and 0.1-70 mol-% of anionic monomers, the polyacrylamide having an intrinsic viscosity in the range of 6-38 dl/g determined in 1 M NaCl at 25° C., adding to the fibre stock inorganic microparticles of siliceous material, such as colloidal silica or bentonite, adding to the fibre stock or to an aqueous flow to be combined with the fibre stock a high-charged cationic coagulant having a charge density over 5 meq/g and preferably over 6 meq/g determined by Mütek PCD at pH 6, and selected from aluminium based coagulants, organic polymers and mixtures thereof, and forming the fibre stock into a fibrous web.

In the present invention it was surprisingly found out that when combining a amphoteric polyacrylamide with inorganic microparticles and a high-charged cationic coagulant, unexpected synergistic effect has been observed, and both drainage and press dewatering and paper strength properties are enhanced. Consequently, the present invention provides 3-component system for use in paper or board manufacturing for increasing paper strength properties. Typical increase in the bursting strength is 3-20%, calculated in relation to the bursting strength of corresponding paper manufactured without sequential addition of amphoteric polyacrylamide with inorganic microparticles and a high-charged cationic coagulant selected from an aluminium based coagulant, organic polymers and mixtures thereof. Adding high-charged cationic coagulant having a charge density over 5 meq/g measured at pH 6, and inorganic microparticles to the amphoteric polymer based paper additive system also improves drainage speed and solids content after press dewatering.

The system according to the invention is especially suitable for use in treating a fibre stock comprising fibres originating from old corrugated cartons (OCC), mixed waste recycled fibre, unbleached kraft pulp and/or unbleached semichemical pulp. Typically this kind of fibre stocks are used for packaging papers, which require drainage, dewatering and strength performance for fibre stocks.

The invention is based on it that before dewatering, the fibre stock is treated with the combination of amphoteric polyacrylamide, microparticles of inorganic material and a high-charged cationic coagulant such as aluminium based coagulant and/or organic polymers, which each are preferably added separately to a fibre stock. It is believed that the high-charged cationic coagulant interacts with the anionic groups of the amphoteric polyacrylamide, and the inorganic microparticles with the cationic groups of the amphoteric polyacrylamide, and the cationic charges of the system floc the anionic components of the fibre stock. In addition to the ability to trap charged components, the 3D arrangement of the present system allows trapping of neutral stock components, such as starch originating from recycled fibres.

Water removal in paper making has several process stages. Most of the water is removed in initial drainage stage by roll or blade forming at wire section, and then dry content is further elevated with suction boxes later at wire section. Wire section is followed by press section, where water is transferred from web to felt in a nip. Efficient flocculation improves initial drainage but does not necessarily lead into good suction box dewatering or press dewatering. Too big floc size may even slower press dewatering and drying of the paper and increase overall steam consumption, and cause unevenness or formation issues, or even pinholes to the paper. The 3-component system according to the present invention provides moderate floc size thereby achieving both good drainage and good press dewatering. Typically, high dosage of conventional high molecular weight retention polymers will generate such large flocs which contain significant amount water. This is not beneficial for press dewatering. The 3-component system according to the present invention with controlled floc size can improve the solids content after pressing.

Further, the benefit of a 3-component system according to the present invention is especially the ability of the system to reflocculate after applying possible shear forces.

The drainage and press dewatering system according to the present invention for manufacture of paper, board or the like comprises amphoteric polyacrylamide, which is a copolymer obtained by polymerizing (meth)acrylamide and 1-80 mol-% of cationic monomers and 0.1-70 mol-% of anionic monomers. In the context of the present application the term "amphoteric polyacrylamide" refers to a polyacrylamide where both cationic and anionic groups are present in an aqueous solution at pH 7. According to an embodiment of the invention the amphoteric polymer is obtained by polymerisation of cationic, anionic and non-ionic monomers. Preferably amphoteric polyacrylamide is obtained by copolymerisation of acrylamide together with both anionic and cationic monomers. It is believed that due to the presence of both anionic and cationic charges, amphoteric polymers are capable of forming loops in papermaking fibre suspension, especially in neutral papermaking pH, thereby preventing too extensive flocculation that could spoil the formation or the press dewatering of the formed web.

The amphoteric polyacrylamide is water-soluble when it is mixed with and dissolved into water. The term "water-soluble" is understood in the context of the present application that the amphoteric polyacrylamide is fully miscible with water. When mixed with excess of water, the amphoteric polyacrylamide is preferably fully dissolved and the obtained polymer solution is preferably essentially free from discrete polymer particles or granules.

According to one preferable embodiment of the present invention, the amphoteric polyacrylamide has an intrinsic viscosity in the range of 6-38 dl/g, preferably 6-20 dl/g, and more preferably 7-15 dl/g. Intrinsic viscosity of the polyacrylamide was determined by a known manner in 1 M NaCl at 25° C. by using an Ubbelohde capillary viscometer, and pH of the polymer solution for capillary viscosity determination was adjusted to 2.7. The intrinsic viscosity of the dissolved amphoteric polyacrylamide is comparable to its average molecular weight. In order to obtain the desired effect in the paper or board product, the polymer composition preferably has a molecular weight inside certain limits, which can be defined by the viscosity of the dissolved polymer composition.

According to one preferable embodiment the amphoteric polyacrylamide has a cationic net charge, determined by Mütec PCD at pH 2.7. This means that the net charge of the amphoteric polyacrylamide remains cationic, i.e. positive, even if the polyacrylamide contains anionic groups. Cationic net charge improves the interaction of the amphoteric polyacrylamide with the fibres. The net charge of the amphoteric polyacrylamide is calculated as the sum of the charges of the cationic and anionic groups present. The cationic charge density of the amphoteric polyacrylamide may be in the range of 0.2-4 meq/g, preferably 0.35-3 meq/g, more preferably 0.5-2 meq/g, and even more preferably 0.6-1.6 meq/g, determined by Mütek PCD at pH 2.7.

According to one embodiment of the invention the amphoteric polyacrylamide is the copolymer obtained by polymerising (meth)acrylamide and 3-50 mol-%, such as 3-25 mol-%, preferably 4-17 mol-%, more preferably 5-12 mol-% of cationic monomers and 0.1-35 mol-%, such as 0.1-24 mol-%, preferably 0.1-15 mol-%, more preferably 0.5-9 mol-%, even more preferably 0.1-8 mol-% of anionic monomers. It has been observed that when the amount of cationic monomers being polymerized is at most 25 mol-%, such as 3-25 mol-%, preferably 4-17 mol-%, more preferably 5-12 mol-%, the flocculation by the amphoteric polyacrylamide proceeds not only via cationic charges once, but also reactivates the flocculation between cationic and anionic groups after breaking the flocs apart in shear forces caused by various process steps, and the amount of cationic monomers is enough to promote drainage, thereby further enhancing the drainage and press dewatering performance of the 3-component system.

The amphoteric polyacrylamide may have a total ionicity of 4-26 mol-%. According to one preferable embodiment the total ionicity of the amphoteric polyacrylamide is in the range of 4-18 mol-%, preferably 5-13 mol-%, more preferably 6-12 mol-%, even more preferably 6-10 mol-%. Total ionicity includes all groups having ionic charge in the amphoteric polyacrylamide, most of the charged groups originating from the ionic monomers, but including also other charged groups originating from chain termination agents or the like. The total ionicity of the polymer of at most 18 mol-% has observed to be beneficial, especially when the intrinsic viscosity is 6-38 dl/g or preferably 6-20 dl/g. Higher ionicity, especially cationicity, could cause overcationization when the polymer product is used in increased dosages. Overcationization by retention system may cause deposit problems and foaming problems.

The cationic monomers may be selected from 2-(dimethylamino)ethyl acrylate (ADAM), [2-(acryloyloxy)ethyl] trimethylammonium chloride (ADAM-Cl), 2-(dimethylamino)ethylacrylate benzylchloride, 2-(dimethylamino) ethyl acrylate dimethylsulphate, 2-dimethylaminoethyl methacrylate (MADAM), [2-(methacryloyloxy)ethyl]trimethylammonium chloride (MADAM-Cl), 2-dimethylaminoethyl methacrylate dimethylsulphate, [3-(acryloylamino)propyl] trimethylammonium chloride (APTAC), [3-(methacryloylamino)propyl] trimethylammonium chloride (MAPTAC), diallyldimethylammonium chloride (DADMAC) and any of their mixtures. Preferably the cationic monomers may be selected from [2-(acryloyloxy) ethyl] trimethylammonium chloride (ADAM-Cl), [3-(acryloylamino)propyl] trimethylammonium chloride (APTAC), and [3-(methacryloylamino)propyl] trimethylammonium chloride (MAPTAC). More preferably the cationic monomer is [2-(acryloyloxy)ethyl] trimethylammonium chloride (ADAM-Cl).

The anionic monomers may be selected from unsaturated mono- or dicarboxylic acids, such as acrylic acid, maleic acid, fumaric acid, itaconic acid, aconitic acid, mesaconic acid, citraconic acid, crotonic acid, isocrotonic acid, angelic acid or tiglic acid. Preferably the anionic groups originate from acrylic acid.

According to one embodiment of the invention the amphoteric polyacrylamide is obtained by gel polymerization of a reaction mixture comprising necessary monomers in a polymerization medium. The monomer content in the reaction mixture at the beginning of the polymerization may be at least 20 weight-%. In gel polymerization the content of non-aqueous solvent in the reaction mixture is preferably less than 10 weight-%, preferably less than 5 weight-%, more preferably less than 3 weight-%. The monomers in the reaction mixture are polymerised in presence of initiator(s) by using free radical polymerization. The temperature in the beginning of the polymerization may be less than 40° C. or less than 30° C. Sometimes the temperature in the beginning of the polymerization may be even less than 5° C. The temperature during polymerization may be 60-90° C. The free radical polymerisation of monomers produces amphoteric polyacrylamide, which is in gel form or highly viscous liquid.

After the gel polymerisation, the amphoteric polyacrylamide is mechanically comminuted, such as shredded or chopped, as well as dried, whereby a particulate product is obtained. Depending on the used reaction apparatus, shredding or chopping may be performed in the same reaction apparatus where the polymerization takes place. For example, polymerization may be performed in a first zone of a screw mixer, and the shredding of the obtained amphoteric polyacrylamide is performed in a second zone of the said screw mixer. It is also possible that the shredding, chopping or other particle size adjustment is performed in a treatment apparatus, which is separate from the reaction apparatus. For example, the obtained water-soluble amphoteric polyacrylamide may be transferred from the second end of a reaction apparatus, which is a belt conveyor, through a rotating hole screen or the like, where it is shredded or chopped into small particles. After shredding or chopping the comminuted polyacrylamide is dried and milled to a desired particle size. Dried polyacrylamide is easy to store and transport, and provides an excellent storage stability and long self-life.

According to one embodiment of the invention the total polymer content of the obtained amphoteric polyacrylamide is at least 60 weight-%, preferably in the range of 70-98 weight-%, more preferably 75-95 weight-%, even more preferably 80-95 weight-%, and yet more preferably 85-93 weight-%. Because the polymer content of the amphoteric polyacrylamide is high, naturally the amount of active amphoteric polyacrylamide is also high. Moisture content of the amphoteric polyacrylamide is typically 5-12 weight-%.

The amphoteric polyacrylamide according to the invention is substantially linear and non-crosslinked. According to a preferred embodiment of the invention water-soluble amphoteric polyacrylamide is prepared substantially in the absence of branching agent(s) or cross-linking agent(s). According to an embodiment of the invention, the polymer comprises <0.01 mol-%, preferably <0.005 mol-%, and more preferably <0.001 mol-% of branching agent or cross-linking agent. Substantially linear and non-crosslinked amphoteric polyacrylamide has the benefit of achieving same performance using lower dosage compared to substantially branched or cross-linked polymers. Substantially linear and non-crosslinked amphoteric polyacrylamide has better dimensional extent, and is thus capable of forming larger networks with microparticles and coagulant, thereby enhancing trapping of e.g. starch. Also the charged groups are more accessible for binding compared to substantially branched or cross-linked polymers.

The drainage and press dewatering system according to the present invention for manufacture of paper, board or the like comprises inorganic siliceous microparticles, such as colloidal silica or bentonite. According to one preferable embodiment of invention, inorganic siliceous microparticles are selected from silica based particles, silica microgels, colloidal silica, silica sols, silica gels, polysilicates, aluminosilicates, polyaluminosilicates, borosilicates, polyborosilicates, zeolites and swellable clays, such as bentonite. Preferably, inorganic siliceous microparticles are colloidal silica or bentonite.

According to one embodiment of the invention, colloidal silica is typically used as 0.5-25 weight-% slurry, and it may have a particle size in the range of 1-50 nm, preferably 2-30 nm. S-value of the colloidal silica may be at most 40%, such as 14-40%, preferably 25-38%. Bentonite is typically used as 1-5 weight-% slurry, and it may have a particle size in the range of 200-800 nm, preferably 300-500 nm. Bentonite and colloidal silica slurries may be further diluted before addition to the fibre stock, if needed.

Furthermore, the drainage and press dewatering system according to the present invention for manufacture of paper, board or the like comprises a high-charged cationic coagulant having a charge density over 5 meq/g and preferably over 6 meq/g determined by Mütek PCD at pH 6. High-charged cationic coagulants are especially efficient in trapping colloids to the formed paper thereby preventing them from blocking the wire or felt. According to an embodiment of the invention a high-charged cationic coagulant having a charge density over 5 meq/g and preferably over 6 meq/g is selected from aluminium based coagulants, organic polymers, and mixtures thereof. The aluminium based coagulant may be selected from the group comprising aluminium sulphate, aluminium chloride, polyaluminium chloride (PAC), polyaluminium silicate, polyaluminium sulphate (PAS), polyaluminium silica sulphate, sodium aluminate, alum and any of their mixture. Organic high-charged cationic polymers may be selected from the group comprising polyethylenimine, polyamine, polyDADMAC, polyAPTAC, polyMAPTAC, poly-ADAM-Cl and mixtures thereof. Preferably the organic high-charged cationic polymers are quaternary amine containing polymers, thus having minimum or no variation of charge with pH, selected from the group comprising polyamines that are copolymers of epichlorohydrin and amine, polyDADMAC, polyAPTAC, polyMAPTAC, poly-ADAM-Cl and mixtures thereof. The organic high-charged cationic polymers may have a weight average molecular weight of 20-900 kDa, preferably 40-400 kDa, more preferably 50-250 kDa, so as to function more as a coagulant and less as a flocculant, like the aluminium based coagulants, thereby balancing the amount of charge neutralization and bridging effect of the 3-component system. According to a preferred embodiment of the invention the coagulant is aluminium based coagulant or branched organic polymer, and more preferably aluminium based coagulant. According to one preferable embodiment of the invention the coagulant is aluminium based coagulant, such as polyaluminium chloride or alum. Aluminium based coagulants are preferred due to their very high charge density and they can be tailor-made to function specifically at the pH of recycled pulp, which pH is typically 6-7.5. The branched organic polymers provide higher molecular weight at lower solution viscosity, which is beneficial from application point of view.

According to one preferred embodiment of the invention, the drainage and dewatering system comprises amphoteric polyacrylamide according to the present description, inorganic microparticles of siliceous material, such as colloidal silica or bentonite, and polyaluminium chloride.

According to one embodiment of the present invention the aluminium based coagulant, e.g. polyaluminium chloride, has a basicity in the range of 20-90%, preferably 30-70%, and more preferably 35-60%. The basicity % equals to mol OH$^-$/mol Al×100/3. Typically polyaluminium chloride has Al content of 4-16 weight-% and preferably 5-10 weight-%.

When the drainage and press dewatering system according to the present invention is used in manufacture of paper, board or the like, the amphoteric polyacrylamide is dissolved into water, whereby an aqueous polyacrylamide solution is obtained. The aqueous polyacrylamide solution may be added to the fibre stock as a wet end chemical. The amphoteric polyacrylamide may be added in the amount of 100-1000 g/t dry fibre stock, preferably 200-900 g/t dry fibre stock, and more preferably 300-700 g/t dry fibre stock.

The aqueous amphoteric polyacrylamide solution may be added either to the thick stock or to the thin stock. Thick stock is here understood as a fibrous stock or furnish, which has consistency of >20 g/l, preferably >25 g/l, more preferably >30 g/l. Thin stock is here understood as a fibrous stock or furnish, which has consistency of 5-20 g/l. In a typical embodiment the amphoteric polymer is added to the thin stock.

When the aqueous solution of amphoteric polyacrylamide is added to the thin stock, especially the drainage may be improved. In one embodiment of the invention, the amphoteric polyacrylamide may be added after a shear stage, such as pumping, mixing or screening. According to one preferable embodiment of the invention the amphoteric polyacrylamide is added after the last shear stage before a headbox of a paper or board machine. The closer the amphoteric polyacrylamide is added to the headbox, the better the flocking effect is achieved.

It has been observed that when the aqueous solution of amphoteric polyacrylamide is added to the thick stock, especially the strength properties of the final paper, board or the like are improved. It is assumed that, without wishing to be bound by any theory, the amphoteric polyacrylamide comes effectively into contact with the fibres, especially in the thick stock, whereby bonds between the charged groups of polyacrylamide and the charged fibre surface are formed. These bonds increase the strength effect which is obtained in the final paper or board. According to one embodiment, the addition of the aqueous solution of the amphoteric polyacrylamide is located after the stock storage towers, but before thick stock is diluted in the wire pit (offmachine silo) with short loop white water. For improved drainage a further addition of the amphoteric polyacrylamide or a cationic polyacrylamide, such as CPAM having proportion of cationic monomer of 5-15 mol-% and molecular weight of 5-20 MDa, into thin stock, preferably in the proximity of the headbox, may be required as described above. According to one embodiment of the invention, the aqueous solution of amphoteric polyacrylamide is added to both the thick stock and the thin stock.

The high-charged cationic coagulant may be added directly to the fibre stock or it may be added first to an aqueous flow, which is later combined with the fibre stock at any suitable location, for example at any suitable wet end location. Examples of such time points or locations include before or after refining of the fibre stock, at the fan pump, before or at the head box.

When the high-charged cationic coagulant is organic polymer it may be added in an amount of 50-1000 g/ton dry pulp, preferably 100-500 g/ton dry pulp. When the high-charged cationic coagulant is aluminium based coagulant it may be added in the amount of 100-700 g/t dry fibre stock as Al$^{3+}$.

According to one embodiment of the invention inorganic microparticles may be added to thin stock having consistency of 5-20 g/l. In one embodiment of the invention, the inorganic microparticles may be colloidal silica which is added in the amount of 100-600 g/t dry fibre stock, preferably 100-500 g/t dry fibre stock. Alternatively, the inorganic microparticles may be bentonite which is added in the amount of 1-4 kg/t dry fibre stock, preferably 1.5-3 kg/t dry fibre stock.

According to one embodiment inorganic microparticles and coagulant may be added prior to the last shear stage before a headbox of a paper or board machine. Typically, prior to a headbox fan pump or machine screen.

According to one preferable embodiment of the invention the amphoteric polyacrylamide, inorganic microparticles, and a high-charged cationic coagulant are added separately from each other, so as to prevent too early interaction between said components and thus e.g. gelling of the components. For example, the amphoteric polyacrylamide may be added to the fibre stock after the addition of the inorganic microparticles and the cationic coagulant. Each component of the drainage and press dewatering system may be added by direct addition to a fibre stock, such as by injection of the said component into the fibre stock prior entry in the headbox. The 3-component system according to the present invention stands shear forces such as pumping, mixing or screening stage or shear forces at the headbox turbulence generator. Consequently, the 3-component system of the invention is able to reflocculate after the shear stage.

In one preferable embodiment, the coagulant component is added separately to the fibre stock, followed by a separate addition of the inorganic microparticle component, such as colloidal silica, and only after a following shear stage the aqueous solution comprising the amphoteric polyacrylamide is added to the fibre stock.

Further additives such as cationic polyacrylamide retention aid, and/or cationic wet-end starch may be added to further improve retention and strength.

In the present context, and as used above, the term "fibre stock" is understood as an aqueous suspension, which comprises fibres and optionally fillers. The fibre stock may also be called pulp slurry or pulp suspension. The fibre stock may comprise ash at least 5 weight-%, at least 10 weight-%, preferably at least 14 weight-%, more preferably at least 16 weight-% based on dry total solids, which may originate from added filler or from fillers and/or mineral pigments of recycled fibre or paper machine broke source. The ash content may be in the range of 10-30% and preferably in the range of 11-19%. The amount of ash is calculated by drying the stock, and measuring the ash content. Standard ISO 1762, at temperature 525° C. is used for ash content measurements. Ash may be any filler or pigment conventionally used in paper and board making, such as ground calcium carbonate, precipitated calcium carbonate, clay, talc, gypsum, titanium dioxide, synthetic silicate, aluminium trihydrate, barium sulphate, magnesium oxide or their any of mixtures. The system of the invention provides improved paper strength, drainage and retention for high ash content stocks compared to the existing systems, since the components of the present invention do not cause excessive flocking which causes bad formation that decreases strength properties of the paper product. Therefore the components of the invention can be used in amounts that significantly improve the ash retention, drainage and strength. Typically webs with high ash contents are weaker and by using the system of the present invention web wet-strength can be improved by increasing dry content after wet pressing, thereby decreasing susceptibility of web breaks and thus loss of production time, and facilitating higher production speed.

According to one preferable embodiment of the invention the amphoteric polyacrylamide, inorganic microparticles and high-charged cationic coagulant may be added to fibre stock comprising recycled fibre material. This means that the fibres in the fibre stock preferably originate from recycled paper and/or old corrugated containerboard (OCC). According to one preferred embodiment the fibre stock to be treated comprises at least 20 weight-%, preferably at least 50 weight-% of fibres originating from recycled fibre material. In some embodiments the fibre stock may comprise even >70 weight-%, sometimes even >80 weight-%, of fibres originating from recycled fibre material. In some embodiments, the invention may be utilized with a fibre stock comprising 100% recycled fibre material as a strength additive and drainage aid to improve machine productivity. The 3-component system of the invention may also be utilized with other cellulosic fibres comprising bleached and unbleached kraft pulp.

According to one embodiment of the invention the fibre stock has a conductivity of at least 2 mS/cm, more preferably at least 3 mS/cm, and yet more preferably in the range of 3.5-10 mS/cm. The 3-component system according to the invention has good retention performance, starch retention performance, strength and drainage performance in these conductivities, compared to a performance of traditional paper chemicals such as CPAM which start to lose their performance already at elevated conductivities. The present invention continues performing well even in higher conductivities.

According to one embodiment of the invention the fibre stock has a starch content of at least 1 weight-%, preferably at least weight-3%, more preferably at least 4 weight-%, based on dry total solids at any point before the addition of the amphoteric polyacrylamide of the invention. The starch content of the fibre stock may be 1-20 weight-%, preferably 2-10 weight-% and more preferably 4-8 weight-%, based on dry total solids, at any point before the addition of the amphoteric polyacrylamide of the invention The system of the invention traps starch, originating from recycled fibre material or starch added to a process, effectively with the effect that paper yield is higher and decreased COD load in waste water. Without wishing to be bound by any theory, it is believed that the components of the present invention form a 3D network-like system which is capable of effectively trapping even non-charged starch.

The system and method of the present invention may be applied to any kind of paper and board making processes. All suitable kinds and grades of papers and boards are included, such as kraft paper, liner board, test liner, fluting, sack paper, white lined chipboard, core board or folding boxboard. Thus, the invention relates to a process for the production of paper or board from a fibre stock treated with the method according to the invention, wherein the treated fibre stock is formed into a fibrous web and drained. The steps of forming a fibre stock, draining and drying may be carried out in any suitable manner generally known to those skilled in the art.

EXPERIMENTAL

Some embodiments of the invention are described in the following non-limiting examples.

Production of Amphoteric Polyacrylamide

General Description of the Polymer Product Preparation

Preparation of monomer solution is described for exemplary examples below and other monomer solutions are prepared in analogous manner. The used monomers and their proportions for each tested polymer product are given in Table 1.

After the monomer solution is prepared according to the description, the monomer solution is purged with nitrogen flow in order to remove oxygen. An initiator, 2-hydroxy-2-methylpropiophenone in polyethylene glycol-water (1:1 by weight), is added to the monomer solution, and the monomer solution is placed on a tray to form a layer of about 1 cm under UV-light. UV-light is mainly on the range 350-400 nm, for example light tubes Philips Actinic BL TL 40W can be used. Intensity of the light is increased as the polymerization proceeds to complete the polymerization. The first 10 minutes the light intensity is 550 $\mu W/cm^2$, and following 30 minutes it is 2000 $\mu W/cm^2$. The obtained gel is run through an extruder and dried to a moisture less than 10% at temperature of 60° C. The dried polymer is ground and sieved to particle size 0.5-1.0 mm.

Preparation of Monomer Solution for EXP 1, which is Net Cationic Amphoteric Polymer, in which Cationic Monomer is ADAM-Cl and Anionic Monomer is Acrylic Acid Monomer solution is prepared by mixing 248.3 g of 50% acrylamide solution, 0.01 g of 40% DTPA Na-salt solution, 2.9 g of sodium gluconate, 4.4 g of dipropylene glycol, 1.9 g of adipic acid, and 7.2 g of citric acid in a temperature controlled laboratory glass reactor at 20-25° C. The mixture is stirred until solid substances are dissolved. To the solution is added 32.6 g of 80% ADAM-Cl. pH of the solution is adjusted to 3.0 with citric acid, and 2.8 g of acrylic acid is added to the solution. The initiator solution is 5 ml of 6% 2-hydroxy-2-methylpropiophenone in polyethylene glycol-water (1:1 by weight) solution. The preparation is continued as described in the general description above.

Preparation of Monomer Solution for EXP 2, which is Net Neutral Amphoteric Polymer, in which Cationic Monomer is MAPTAC and Anionic Monomer is Acrylic Acid Monomer solution is prepared by mixing 241.4 g of 50% acrylamide solution, 0.0085 g of 40% DTPA Na-salt solution, 2.8 g of sodium gluconate, 1.8 g of adipic acid, and 6.5 g of citric acid in a temperature controlled laboratory glass reactor at temperature of 20-25° C. The mixture is stirred until solid substances are dissolved. To the solution is added 41.7 g of 50% MAPTAC. PH of the solution is adjusted to 3.0 with citric acid, and 6.8 g of acrylic acid is added to the solution. The initiator solution is 6.5 ml of 12% 2-hydroxy-2-methylpropiophenone in polyethylene glycol-water (1:1 by weight) solution. The preparation is continued as described in the general description above.

Preparation of Monomer Solution for EXP 3, which is Net Anionic Amphoteric Polymer, in which Cationic Monomer is MAPTAC and Anionic Monomer is Acrylic Acid Monomer solution is prepared by mixing 255.3 g of 50% acrylamide solution, 0.0085 g of 40% DTPA Na-salt solution, 2.8 g of sodium gluconate, 6.5 g of citric acid and 1.8 g of adipic acid in a temperature controlled laboratory glass reactor at temperature of 20-25° C. The mixture is stirred until solid substances are dissolved. To the solution is added 22.1 g of 50% MAPTAC. pH of the solution is adjusted to 3.0 with citric acid, and 11.6 g of acrylic acid is added to the solution. The initiator solution is 6.5 ml of 12% 2-hydroxy-2-methylpropiophenone in polyethylene glycol-water (1:1 by weight) solution. The preparation is continued as described in the general description above.

Intrinsic viscosities of the polymer products were determined by Ubbelohde capillary viscometer in 1 M NaCl at 25° C. pH of the polymer solution for capillary viscosity determination was adjusted to 2.7 by formic acid to avoid impact of probable poly-ion complexation for viscosity. Molecular weights were calculated using "K" and "a" parameters of polyacrylamide. The value of parameter "K" is 0.0191 ml/g and the value of parameter "a" is 0.71. Determined intrinsic viscosity values and calculated molecular weight values for the tested polymer products are also given in Table 1.

TABLE 1

Monomers, their proportions, intrinsic viscosity values and calcuated molecular weight values for tested polymer products.

| No. | Test product | Acrylamide (mol-%) | ADAM-Cl (mol-%) | MAPTAC (mol-%) | Acrylic acid (mol-%) | Intrinsic viscosity (dl/g) | MW based IV (PAM coeff.) (Mg/mol) |
|---|---|---|---|---|---|---|---|
| 1 | EXP 1 | 91 | 7 |  | 2 | 7.2 | 2.8 |
| 2 | EXP 2 | 90 |  | 5 | 5 | 7.9 | 3.2 |
| 3 | EXP 3 | 89.5 |  | 2.5 | 8 | 7.6 | 3.0 |

TABLE 3

Properties of pulps and waters.

| Measurement | OCC | Kraft | White water | Clear Filtrate |
|---|---|---|---|---|
| pH | 6.6 | 6.9 | 7.5 | 7.5 |
| Turbidity, NTU | 615 | 33.1 | 24.9 | 31.2 |
| Conductivity, mS/cm | 6.8 | 1.7 | 3.6 | 2.8 |
| Charge, μekv/l | −738 | −214 | −73 | −83 |
| Zeta potential, mV | −4.4 | −17.0 |  |  |
| Consistency, g/l | 50.2 | 30.6 |  |  |

DDA Test

DDA (dynamic drainage analyzer) from Akribi Kemi Konsulter, Sweden was used to measure retention and drainage. 500 ml of pulp was used for each test point. Alum and pulp were added to 500 ml breaker with 100 rpm magnetic stirring for 10 min before drainage. Pulp was poured to DDA 30 s before drainage and DDA stirrer was adjusted to 1000 rpm. Test chemical addition times are indicated as negative time before the drainage starts in Table 4. Stirring was stopped 2 s before drainage. Vacuum was 300 mbar for 30 s after drainage started, and wire opening was 0.25 mm.

Drainage time was recorded and filtrate turbidity was measured immediately. Wet sheet was weighted and wet pressing of the sheets was completed individually immediately after drainage tests by using Lorenz & Wettre (wet press for 1 min at 4 bar pressure, 2 plotter papers both sides of the DDA cake). Pressed sheet was weighted and then sheet from the wire was dried in Lorenz & Wettre hot plate dryer to abs dry for retention calculation. Sheets were weighted after drying. SCT was measured from the DDA sheets.

Determination of Soluble Starch from DDA Filtrate

Tests use following procedure developed in this project for recycled fiber starch determination:

25 ml of filtrate was added to 10 ml of 10%-w HCl. Mixture was stirred for 10 min in 50 ml breaker with magnetic stirrer and then mixture was filtrated by gravitation in a funnel with black ribbon filter paper. 1 ml of filtrated mixture was added to 0.5 ml iodine reagent, which consisted 7.5 g KM +5 g/l I2. Absorbance value was measured at 610 nm by Hach Lange DR 900 spectrophotometer 2 min after iodine-solution was added. Zeroing of the spectrophotometer was done with the sample before iodine addition.

C*film 07311 non-ionic degraded starch was used as reference to make calibration equation for starch content. Test pulp starch content was determined by same method than DDA filtrate starch content. Blanc test for HCl-iodine solution absorbance was made to subtract baseline absorbance from the result. Starch retention was calculated as: (pulp starch−filtrate starch)/pulp starch*100%.

APPLICATION EXAMPLES

Methods

Pulp and sheet testing devices and standards are given in Table 2. The indexed SCT strength value is the strength divided by basis weight of the paper/board.

TABLE 2

Pulp and sheet testing devices and standards.

| Property/Measurement | Device/Standard |
|---|---|
| pH | Knick Portamess 911 |
| Turbidity (NTU) | WTW Turb 555IR |
| Conductivity (mS/cm) | Knick Portamess 911 |
| Charge (μekv/l) | Mütek PCD 03 |
| Zeta potential (mV) | Mütek SZP-06 |
| Consistency (g/l) | ISO 4119 |
| Basis weight | Mettler Toledo/ISO 536 |
| Ash content, 525° C. | ISO 1762 |
| SCT | ISO 9895 |

Application Example 1

Pulp Preparation

European OCC and kraft (unbleached) was used as a raw material. The OCC contains about 16% ash. The original starch of OCC pulp was consumed from the sample during the storage time of 1 week in +5° C. temperature. Pulp and water properties are presented at Table 3. OCC and kraft were mixed in 1:1 ratio based on dry matter. Dilution water was prepared by mixing white water and clear filtrate in 1:1 ratio. Pulp mixture was diluted with the prepared dilution water to 0.7% consistency. Starch content of test pulp was about 2.5%, based on dry total solids.

Chemicals

Alum: Aluminium sulphate, dry.

Wet end starch: Meribond 155 by Tate&Lyle, cooked at 1% concentration in 97° C. for 30 min.

Surface size starch: C*film 07312 by Cargill, cooked at 1% concentration in 97° C. for 30 min.

EXP 1, amphoteric PAM described in earlier example, dissolved to 0.5% and further diluted to 0.05%.

CPAM1: FennoPol K6340T, high molecular weight dry cationic polyacrylamide retention polymer by Kemira.

Bentonite: Altonite SF by Kemira, retention bentonite.

Test Results

Test program is presented at Table 4. Based on the results (Table 5) compared to test 3, which is typical drainage system for linerboard, the system according to the invention in tests 6-7 achieved simultaneously fast drainage time, low filtrate turbidity, high dryness after forming, high solids content after pressing, retention, SCT strength and ash retention measured by sheet ash. The effect of amphoteric polymer in test 9 was also clear compared to test 8 without amphoteric polymer. Test 11 shows drop in the SCT strength, when high dosage of conventional retention polymer is used.

TABLE 4

Test points.

| Test | −600 Alum, kg/t | −40 Wet end starch, kg/t | −40 Surface size starch, kg/t | −30 EXP 1, kg/t | −20 CPAM 1, kg/t | −10 bentonite, kg/t |
|---|---|---|---|---|---|---|
| 1 |  | 3.9 | 40 |  |  |  |
| 2 |  | 3.9 | 40 |  |  | 3.5 |
| 3 |  | 3.9 | 40 |  | 0.2 | 3.5 |
| 4 |  | 3.9 | 40 | 0.4 |  | 3.5 |
| 5 | 8 | 3.9 | 40 | 0.2 | 0.1 | 3.5 |
| 6 | 8 | 3.9 | 40 | 0.4 | 0.1 | 3.5 |
| 7 | 8 | 3.9 | 40 | 0.6 | 0.1 | 3.5 |
| 8 | 8 | 3.9 | 40 |  |  | 3.5 |
| 9 | 8 | 3.9 | 40 | 0.6 |  | 3.5 |
| 10 | 4 | 3.9 | 40 | 0.4 | 0.1 | 3.5 |
| 11 |  | 3.9 | 40 |  | 0.6 | 3.5 |

TABLE 5

Test results.

| Test | Drainage time, s | Filtrate turbidity, NTU | Dryness after forming, % | Retention, % | Solids after wet pressing, % | SCT index, Nm/g | Sheet ash, % |
|---|---|---|---|---|---|---|---|
| 1 | 5.2 | 393 | 16.7 | 86.9 | 43.4 | 23.8 | 6.4 |
| 2 | 5.5 | 272 | 16.7 | 89.7 | 42.8 | 23.2 | 7.1 |
| 3 | 4.5 | 212 | 16.9 | 92.3 | 43.9 | 24.0 | 7.3 |
| 4 | 3.9 | 143 | 17.4 | 92.8 | 44.5 | 22.1 | 7.6 |
| 5 | 4.8 | 172 | 17.4 | 92.1 | 44.4 | 23.5 | 7.6 |
| 6 | 4.2 | 137 | 17.4 | 93.2 | 44.0 | 25.4 | 7.7 |
| 7 | 3.6 | 115 | 17.6 | 94.8 | 44.8 | 24.8 | 7.7 |
| 8 | 6.1 | 322 | 17.0 | 92.7 | 43.9 | 24.3 | 6.8 |
| 9 | 4.3 | 133 | 17.6 | 95.2 | 45.1 | 25.3 | 7.6 |
| 10 | 4.0 | 124 | 17.7 | 95.4 | 43.9 | 25.5 | 7.6 |
| 11 | — | — | — | 93.7 | — | 21.4 | 7.6 |

Application Example 2

Pulp Preparation

Central European testliner board was used as a raw-material. The testliner contains about 17% ash and 5% surface size starch, which was enzymatically degraded native corn starch. Dilution water was made from tap water by adjusting $Ca^{2+}$ concentration to 520 mg/l by $CaCl_2$ and by adjusting conductivity to 4 mS/cm by NaCl. Testliner board was cut to 2*2 cm squares. 2.7 l of dilution water was heated to 85° C. The pieces of testliner were wetted for 5 minutes in dilution water at 2% concentration before disintegration. Slurry was disintegrated in Britt jar disintegrator with 30 000 rotations. Pulp was diluted to 0.5% by adding dilution water.

DDA Test

DDA (dynamic drainage analyzer) from Akribi Kemi Konsulter, Sweden was used to measure retention and drainage. 500 ml of pulp was used for each test point. Polyaluminium chloride (PAC) and pulp were added to 500 ml breaker with 100 rpm magnetic stirring for 10 min before drainage. Other test chemical addition times are indicated as negative time before the drainage starts in Table 6. Pulp was poured to DDA 30 s before drainage and DDA stirrer was adjusted to 1000 rpm. Stirring was stopped 2 s before drainage. Vacuum was 300 mbar for 30 s after drainage started, and wire opening was 0.25 mm.

Drainage time was recorded and filtrate turbidity was measured immediately. Wet sheet was weighted. Wet pressing of the sheets was completed individually immediately after drainage tests in Lorenz & Wettre wet press for 1 min at 4 bar pressure, 2 plotter papers both sides of the DDA cake. Pressed sheet was weighted. Sheet from the wire was dried in Lorenz & Wettre hot plate dryer to abs dry for retention calculation, and sheets were weighted after drying.

Determination of Soluble Starch from DDA Filtrate

The determination of soluble starch was carried out as previous application example.

Chemicals

PAC 3: Polyaluminium chloride, 5.2% Al and 70% basicity.

Silica: structured colloidal silica, S-value: 34, surface area 750, pH: 10.6, water solution diluted to 0.5%.

EXP 1, amphoteric PAM described in earlier example, dissolved to 0.5% and further diluted to 0.05%.

EXP 2, amphoteric PAM described in earlier example, dissolved to 0.5% and further diluted to 0.05%.

EXP 3, amphoteric PAM described in earlier example, dissolved to 0.5% and further diluted to 0.05%.

APAM: FennoPol A8050 R, high molecular weight dry anionic polyacrylamide retention polymer by Kemira.

Test Results

Test plan and results are presented at Tables 6-7. Conventional drainage system with APAM (test 4-5) uses dosages of 0.1-0.2 kg/t, because higher dosage is not contribuuting to retention or drainage. The systems according to the invention (tests 6-11) are improving drainage time, filtrate turbidity, filtrate starch reduction and retention. EXP 1, net cationic amphoteric polymer is performing better than neutral or anionic amphoteric polymer.

TABLE 6

Test plan, dosing time and dosage amounts.

| | Time, s | | | | | |
|---|---|---|---|---|---|---|
| Test | −600 PAC 3. kg/t as product | −15 Silica, kg/t | −10 APAM, kg/t | −10 EXP3, kg/t | −10 EXP2, kg/t | −10 EXP1, kg/t |
| 1 | | | | | | |
| 2 | 10 | | | | | |
| 3 | 10 | 0.45 | | | | |
| 4 | 10 | 0.45 | 0.1 | | | |
| 5 | 10 | 0.45 | 0.2 | | | |
| 6 | 10 | 0.45 | | 0.4 | | |
| 7 | 10 | 0.45 | | 0.8 | | |
| 8 | 10 | 0.45 | | | 0.4 | |
| 9 | 10 | 0.45 | | | 0.8 | |
| 10 | 10 | 0.45 | | | | 0.4 |
| 11 | 10 | 0.45 | | | | 0.8 |

TABLE 7

Test results.

| Test | Drainage time, s | Filtrate turbidity, NTU | Filtrate starch absorbancy | Filtrate starch reduction, % | Retention, % |
|---|---|---|---|---|---|
| 1 | 11.2 | 707 | 0.649 | 0 | 90.6 |
| 2 | 7.27 | 557 | 0.589 | 9 | 90.4 |
| 3 | 15.15 | 538 | 0.564 | 13 | 91.0 |
| 4 | 10.02 | 176 | 0.551 | 15 | 92.5 |
| 5 | 8.15 | 102 | 0.527 | 19 | 92.3 |
| 6 | 7.85 | 103 | 0.541 | 17 | 92.7 |
| 7 | 5.85 | 96 | 0.528 | 19 | 93.6 |
| 8 | 9.15 | 86 | 0.517 | 20 | 92.8 |
| 9 | 8.41 | 95 | 0.532 | 18 | 93.9 |
| 10 | 7.34 | 102 | 0.508 | 22 | 94.0 |
| 11 | 6.28 | 75 | 0.509 | 22 | 92.4 |

Application Example 3

Pulp preparation, DDA test and starch determination as in previous example, but testliner was from Eastern Europe, having about 16% ash and about 5 starch.

Chemicals

PAC 1: Polyaluminium chloride, 7.5% Al and 40% basicity.

PAC 3: Polyaluminium chloride, 5.2% Al and 70% basicity.

Silica: structured colloidal silica, S-value: 34, surface area 750, pH: 10.6, water solution diluted to 0.5%.

EXP 2, amphoteric PAM described in earlier example, dissolved to 0.5% and further diluted to 0.05%.

Test Results

Tests are comparing PAC coagulants (Table 8-9) and dosage levels of components. Both PAC1 and PAC3 performed well. Best result was obtained with test 8, which has highest dosage of components. Test 2 indicated PAC dosage (0.375 kg/t as Al) that was too low to achieve best performance. It is beneficial to keep certain dosage ratio range for system components with different charges. Tests 5-6 are on same level than tests 3-4. This indicates that added Al-content is critical, and basicity range of 40-70% is good for this application.

TABLE 8

Test plan, dosing time and dosage amounts.

| Time, s Test | −600 PAC 1, kg/t as product | −600 PAC 3, kg/t as product | −15 Silica, kg/t | −10 EXP2, kg/t |
|---|---|---|---|---|
| 1 | | | 0 | |
| 2 | 5 | | 0.38 | 0.5 |
| 3 | 10 | | 0.38 | 0.5 |
| 4 | 20 | | 0.38 | 0.5 |
| 5 | | 7.5 | 0.38 | 0.5 |
| 6 | | 15 | 0.38 | 0.5 |
| 7 | 20 | | 0.38 | 1 |
| 8 | 20 | | 0.75 | 1 |
| 9 | 10 | | 0.75 | 0.5 |
| 10 | 10 | | 0.75 | 1 |

TABLE 9

Test results

| Test | Drainage time, s | Retention, % | Turbidity, NTU | Filtrate starch, ppm |
|---|---|---|---|---|
| 1 | 11.6 | 96.5 | 721 | 298 |
| 2 | 8.7 | 98.9 | 157 | 283 |
| 3 | 7.6 | 100.0 | 115 | 249 |
| 4 | 7.5 | 99.7 | 113 | 224 |
| 5 | 7.5 | 99.0 | 105 | 252 |
| 6 | 7.1 | 99.3 | 105 | 228 |
| 7 | 6.0 | 99.0 | 76 | 227 |
| 8 | 5.3 | 98.8 | 94 | 209 |
| 9 | 7.3 | 99.4 | 122 | 241 |
| 10 | 6.0 | 98.8 | 120 | 239 |

Application Example 4

Pulp preparation, DDA test and starch determination as in previous example, but Eastern European testliner was disintegrated to clear filtrate and 250 ml of white water was added to 250 ml of 1% consistency pulp at −30 s in DDA test. Water properties are expressed in Table 10.

TABLE 10

Water properties for test furnish manufacturing.

| | clear filtrate | wire water |
|---|---|---|
| pH | 6.8 | 6.7 |
| Turbidity, NTU | 158 | 73.6 |
| Conductivity, mS/cm | 1.79 | 2.23 |
| Charge, µekv/l | −21.4 | −22.76 |
| Consistency, g/l | 0.34 | 2.76 |
| Ash content, % | 50.26 | 49.35 |
| Ca mg/l | 460 | — |
| Suspended solids, g/l | 4.11 | — |

Chemicals

PAC 3: Polyaluminium chloride, 5.2% Al and 70% basicity.

EXP 1, amphoteric PAM described in earlier example, dissolved to 0.5% and further diluted to 0.05%.

CPAM 2: FennoPol K3500 P, medium molecular weight dry cationic polyacrylamide retention polymer by Kemira.

Bentonite: Altonite SF by Kemira, retention bentonite.

Test Results

Experiments of this example (Table 11-12) indicate that drainage time, solids after forming and solids after pressing can be improved simultaneously with inventive system in test 5-7 compared to system without amphoteric polymer.

Very good filtrate turbidity was achieved in tests 6-7, where amphoteric polymer dosage was 0.5-0.7 kg/t. Amphoteric polymer performs also alone (tests 2-3), but the superior drainage time and starch retention improvements are obtained only using all three components.

TABLE 11

Test plan, dosing time and dosage amounts

| Time, s Test | −600 PAC 3, kg/t as product | −40 EXP1, kg/t | −15 CPAM2, kg/t | −10 bentonite, kg/t |
|---|---|---|---|---|
| 1 | | | 0 | |
| 2 | | 0.3 | | |
| 3 | | 0.5 | | |
| 4 | 8 | | 0.12 | 2 |
| 5 | 8 | 0.3 | 0.12 | 2 |
| 6 | 8 | 0.5 | 0.12 | 2 |
| 7 | 8 | 0.7 | 0.12 | 2 |

TABLE 12

Test results

| Test | Drainage time, s | Filtrate turbidity, NTU | Starch Absorbancy | Starch retention, % | Solids after wet pressing, % | Solids after forming, % | Retention, % |
|---|---|---|---|---|---|---|---|
| 1 | 9.44 | 1870 | | | 46.8 | 22.7 | 93.8 |
| 2 | 8.16 | 998 | 1.17 | 2.5 | 49.5 | 25.4 | 99.6 |
| 3 | 7.55 | 751 | 1.07 | 11.3 | 50.2 | 25.2 | 97.8 |
| 4 | 9.12 | 1165 | 0.97 | 20.6 | 49.2 | 25.3 | 97.0 |
| 5 | 7.02 | 751 | 0.99 | 19.0 | 50.1 | 25.7 | 98.2 |
| 6 | 6.17 | 583 | 0.98 | 19.4 | 49.7 | 25.3 | 97.3 |
| 7 | 4.59 | 508 | 0.99 | 19.1 | 50.9 | 25.3 | 96.2 |

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A drainage and a press dewatering system for manufacture of paper, board or the like, comprising:
    (a) an amphoteric polyacrylamide, which is a copolymer obtained by polymerizing (meth)acrylamide and 1-25 mol-% of cationic monomers and 0.1-24 mol-% of anionic monomers, the polyacrylamide having an intrinsic viscosity in a range of 6-38 dl/g determined in 1 M NaCl at 25° C.,
    (b) inorganic microparticles of siliceous material, selected from colloidal silica or bentonite, and
    (c) a high-charged cationic coagulant having a charge density over 5 meq/g determined at pH 6 and selected from aluminum based coagulants, organic polymers and mixtures thereof.

2. The system according to claim 1, wherein the amphoteric polyacrylamide has the intrinsic viscosity in a range of 6-20 dl/g, determined in 1 M NaCl at 25° C.

3. The system according to claim 1, wherein the amphoteric polyacrylamide has a cationic net charge, determined by Mütek PCD at pH 2.7.

4. The system according to claim 1, wherein a cationic charge density of the amphoteric polyacrylamide is in a range of 0.2-4 meq/g, determined by Mütek PCD at pH 2.7.

5. The system according to claim 1, wherein the amphoteric polyacrylamide is the copolymer obtained by polymerizing (meth)acrylamide, 4-17 mol-% of cationic monomers and 0.1-15 mol-% of anionic monomers.

6. The system according to claim 1, wherein the amphoteric polyacrylamide is obtained by gel polymerization, where content of non-aqueous solvent during the polymerization is less than 10 weight-%.

7. The system according to claim 6, wherein the polymer content of the amphoteric polyacrylamide is at least 60 weight-%.

8. The system according to claim 1, wherein the amphoteric polyacrylamide comprises <0.01 mol-%, preferably of branching agent or cross-linking agent.

9. The system according to claim 1, wherein the high-charged cationic coagulant is:
    aluminum based coagulant, which is selected from a group comprising aluminum sulphate, aluminum chloride, polyaluminum chloride (PAC), polyaluminum silicate, polyaluminum sulphate (PAS), polyaluminum silica sulphate, sodium aluminate, alum and any of their mixture, and/or
    organic polymer, which is selected from polyethylenimine, polyamine, polyDADMAC, polyAPTAC, polyMAPTAC, poly-ADAM-CI and any of their mixture.

10. The system according to claim 1, wherein the system further comprises cationic starch and/or cationic polyacrylamide.

11. The system according to claim 1 used in manufacturing of kraft paper, liner board, test liner, fluting, sack paper, white lined chipboard, core board or folding boxboard.

12. A method for manufacture of paper, board or the like, comprising:
    obtaining a fibre stock comprising fibres originating from recycled fibre material, unbleached kraft pulping and/or unbleached semichemical pulping, whereby the fibre stock has a conductivity of at least 1 mS/cm;
    adding to the fibre stock an aqueous solution of a water-soluble amphoteric polyacrylamide, which is a copolymer obtained by polymerizing (meth)acrylamide and 1-25 mol-% of cationic monomers and 0.1-24 mol-% of anionic monomers, the polyacrylamide having an intrinsic viscosity in a range of 6-38 dl/g determined in 1 M NaCl at 25° C.;
    adding to the fibre stock inorganic microparticles of siliceous material, selected from colloidal silica or bentonite;
    adding to the fibre stock or to an aqueous flow to be combined with the fibre stock a high-charged cationic coagulant having a charge density over 5 meq/g determined at pH 6 and selected from aluminum based coagulants, organic polymers and mixtures thereof; and forming the fibre stock into a fibrous web.

13. The method according to claim 12, wherein the amphoteric polyacrylamide is added in an amount of 100-1000 g/t dry fibre stock.

14. The method according to claim 12, wherein the amphoteric polyacrylamide is added to thin stock having consistency of 5-20 g/l for improving drainage or thick stock having consistency of >20 g/l for improving paper strength properties.

15. The method according to claim 12, wherein the amphoteric polyacrylamide is added after last shear stage before a headbox of a paper or board machine.

16. The method according to claim 12, wherein the inorganic microparticles of colloidal silica are added in the amount of 100-600 g/t dry fibre stock, or the inorganic microparticles of bentonite are added in an amount of 1-4 kg/t dry fibre stock.

17. The method according to claim 12, wherein the inorganic microparticles are added to thin stock having consistency of 5-20 g/l.

18. The method according to claim 12, wherein the amphoteric polyacrylamide, inorganic microparticles, and high-charged cationic coagulant are added separately from each other.

19. The method according to claim 18, wherein the amphoteric polyacrylamide is added after the addition of the microparticles and the high-charged cationic coagulant.

20. The method according to claim 12, wherein the coagulant is aluminum based coagulant, which is added in an amount of 100-700 g/t dry fibre stock as $Al^{3-}$, or the coagulant is organic polymer which is added in an amount of 50-1000 g/ton dry pulp.

21. The method according to claim 12, wherein the fibre stock comprises at least 20 weight-% of fibres originating from recycled fibre material.

22. The method according to claim 12, wherein the fibre stock has a conductivity of at least 2 mS/cm.

23. The method according to claim 12, wherein the fibre stock has a starch content of at least 1 weight-%, based on dry total solids.

24. The method according to claim 12, wherein the fibre stock has an ash content of at least 10 weight-%, based on dry total solids.

* * * * *